United States Patent [19]
Fletcher et al.

[11] 3,807,656
[45] Apr. 30, 1974

[54] AIRLOCK

[76] Inventors: James C. Fletcher, Administrator of the National Aeronautics and Space Administration, with respect to the invention of; Hal R. Linderfelt, 1594 Skyline Drive, Santa Ana, Calif. 92705

[22] Filed: Jan. 24, 1972

[21] Appl. No.: 220,274

[52] U.S. Cl. .................. 244/1 SS, 49/68, 61/83
[51] Int. Cl. ............................................ B64g 1/00
[58] Field of Search ............... 244/1; 49/68; 61/83; 302/62; 114/16.4–16.6

[56] References Cited
UNITED STATES PATENTS

| | | | |
|---|---|---|---|
| 1,721,039 | 7/1929 | Risher | 49/68 |
| 2,926,012 | 2/1960 | Maher | 49/68 |
| 2,927,787 | 3/1960 | Maher | 49/68 |
| 3,136,007 | 6/1964 | Maher et al. | 49/68 |

*Primary Examiner*—Duane A. Reger
*Assistant Examiner*—Jesus D. Sotelo
*Attorney, Agent, or Firm*—L. D. Wofford, Jr.; W. M. Riggins; John R. Manning

[57] ABSTRACT

An airlock for use in transferring waste objects from a positively pressurized enclosure aboard an operative space vehicle, to a waste receiver attached to the vehicle and maintained at the negative pressure of a celestial space environment. The airlock is characterized by a shell having an internal chamber and hermetically sealed within an opening formed in a bulkhead of the enclosure. The shell is provided with an insertion hatch adjacent to the enclosure, and an ejection hatch adjacent the waste receiver, each of the hatches being hermetically sealed by a hatch cover supported for deployment to a hatch-opening disposition through a manipulation of a hatch-deploying mechanism. A three-way selector valve is coupled with the deploying mechanism and ported to an internal chamber of the shell, the enclosure, and the environment and is provided for alternately coupling the chamber with the enclosure and the receiver, in direct communication, in response to a manipulation of the mechanism whereby a sequence is imposed on the operation of the airlock.

19 Claims, 27 Drawing Figures

AIRLOCK

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to airlocks for use in transferring substances from a first pressure zone to a second pressure zone, and more particularly to an airlock employed aboard a space vehicle in discharging objects of waste from a cabin enclosure, maintained at a pressure of substantially one atmosphere, to a waste receiver maintained at the pressure of the celestial space environment.

The prior art is replete with airlocks for use in transferring objects, substances, bodies and the like between pressure zones maintained at different pressures. Such airlocks often are employed aboard craft designed for under-water operation. However, currently available airlocks fail to meet the stringent requirements established for airlocks employed in discharging objects of waste to a negatively pressurized zone, of a celestial space emvironment, from positively pressurized zones of cabin enclosures aboard space vehicles operating in a celestial space environment.

On space missions of extended duration, substantial quantities of objects of waste solids of a general nature, require periodic disposal. To accommodate such disposal, airlocks are employed as a conduit through which the objects are passed to the space environment. Consequently, any airlock so employed must be capable of receiving and discharging waste solids between adjacent pressure zones, in a zero gravity environment, without endangering crew members. Hence, it is imperative that the airlock employed be highly reliable, safe, mechanically simple, easy to operate, as well as being capable of accommodating pressures within a range of pressures normally encountered during both the launch and operating phases of a given mission for a space vehicle.

While various airlocks have been proposed for use aboard operating space vehicles, and certain of these airlocks have met with limited success, none of the currently available airlocks totally fulfill existing needs.

SUMMARY OF THE INVENTION

It is therefore an object of the instant invention to provide an improved airlock for use in transferring objects betweeen adjacent pressure zones.

It is another object to provide an improved airlock for use aboard a space vehicle which is completely safe, highly reliable, of rugged construction, easy to operate, inexpensive to fabricate, and easy to repair.

It is another object to provide an improved airlock for use in transferring substances from a cabin enclosure aboard an operating space vehicle to the space vehicle's environment without subjecting the cabin to the pressures of the environment.

It is another object to provide a manually operable airlock for use in discharging selected objects of waste from a positively pressurized cabin enclosure aboard an operative space vehicle to a waste receiver attached to the vehicle and maintained at the negative pressure of celestial space.

It is another object to provide an airlock for use in discharging waste from a cabin enclosure of a space vehicle to the vacuum of space which is capable of withstanding pressures of a magnitude within a range of operative pressures encountered during both the launch and operation phases for a space vehicle in the performance of a mission of an extended duration.

These and other objects and advantages of the instant invention are achieved by an airlock which includes a shell having defined therein an hermetically sealed chamber communicating with a cabin enclosure and a waste receiver through a air of mutually spaced hatches, one of which is at all times supported against displacement by a pressure differential established between the enclosure and celestial space, and a pressure control system coupled with the chamber for alternately equalizing pressures confined within the chamber with that of the enclosure and the space vehicle environment, whereby a zero pressure differential alternately is established between the opposite faces of each of the hatch covers for thereby limiting hatch-opening displacement of the hatch covers to an alternate displacement.

BRIEF DESCRIPTION OF THE DRAWINGS

FIG. 27 is a fragmentary view of a seal employed in establishing an hermetic seal about the ejection hatch cover.

DESCRIPTION OF THE PREFERRED EMBODIMENT

General Description

Figure 1:
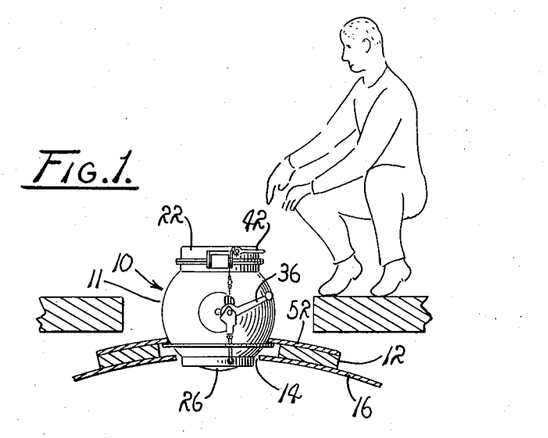
FIG. 1 is a pictorial view, partially sectioned, depicting an airlock embodying the principles of the present invention mounted for use in discharging waste materials from a cabin enclosure of an operative space vehicle to a waste receiver attached to the vehicle.

Referring now to the drawings wherein like reference characters designate like or corresponding parts throughout the several views, there is shown in FIG. 1 an airlock 10 which embodies the principles of the instant invention.

As illustrated, the airlock 10 includes a shell 11 mounted on a circular jamb 12 fixed about an opening 14 provided in a bulkhead 16 employed as a separating bulkhead for a cabin enclosure defined aboard an operative space vehicle. As a practical matter, waste receptacle is provided adjacent to the bulkhead 16 by an expanded LOX tank which is vented and screened in a manner which renders the tank particularly susceptible for usage as a waste receptacle. Since the particular receptacle employed can, in practice, be varied as found desirable, a detailed description of the receptacle is omitted in the interest of brevity. However, it is to be understood that the airlock 10 is employed as a conduit through which objects or substances of waste and the like are transferred between adjacent pressure zones to which the opposite faces of the bulkhead 16 are subjected. Of course, where the airlock 10 is employed in a celestial space environment, the pressure of the zone withihn he cabin enclosure normally is one atmosphere, while the pressure of the zone within the receptacle is the nagative pressure of the vacuum of space.

It is important to understand that while the airlock 10 is particularly suited for use in transferring objects through a bulkhead of an operative space vehicle, it can be employed equally as well in substantially any environment wherein a pressure differential is established thereacross.

Figure 2:
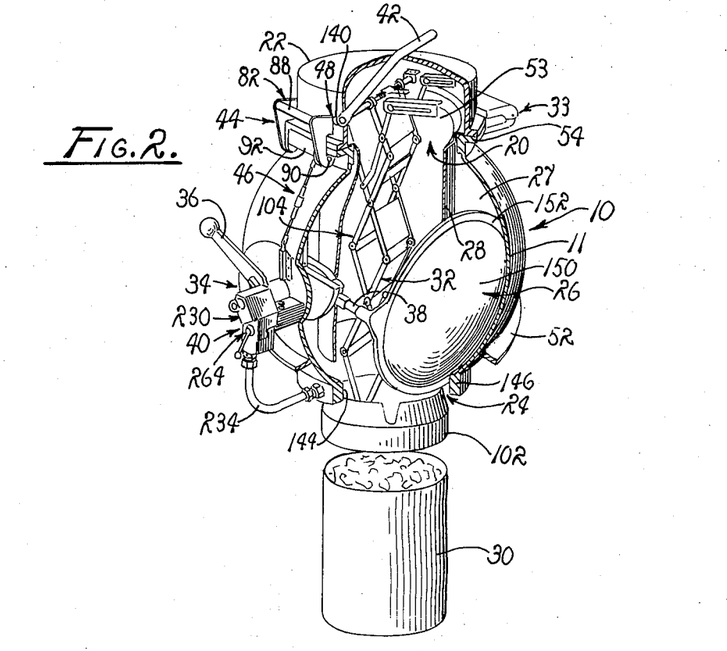
FIG. 2 is a partially sectioned, perspective view of the airlock shown in FIG. 1, illustrating the airlock in a waste ejection configuration wherein the cover for the insertion hatch thereof is in its hatch-sealing disposition, the cover for the ejection hatch is in its hatch-opening disposition and the ejection ram is fully extended for ejecting objects of waste material confined within a trash bag.

As illustrated in FIG. 2, the airlock includes an insertion hatch 20 sealed by a hatch cover 22, and an ejection hatch 24, sealed by a hatch cover 26 of the so-called "eyelid" class of hatch covers. The insertion hatch 20 facilitates a deposit of objects in the airlock 10 while the ejection hatch 24 accommodates a discharge of the objects therefrom. Within the airlock 10 there is a chamber 27 having seated therein a cylindrical body 28 which serves to receive and retain a trash bag 30 employed for receiving articles of waste deposited through the insertion hatch 20. Discharge of the bag 30, bearing the inserted objects of waste, is effected by an extension of an ejection ram 32 which forcibly expels the bag from the body 28 and the chamber 27.

The cover 22 for the insertion hatch 20 is supported for oscillation about a pivotal coupling 33 while the cover 26 for the ejection hatch 24 is supported by a hatch-deployment mechanism, generally designated 34. This mechanism includes a pivotally displaceable handle 36 connected with the hatch cover 26 through a pair of mutually spaced lifting links 38 which, in operation, are driven in rectilinear displacement as well as in pivotal oscillation. The handle 36 is manually manipulated to advance the cover 26 along the segmented path of deployment, determined by the motion of the links 38, having a linear segment immediately adjacent to the ejection hatch 24 and an arcuate terminal segment through which the cover 26 is advanced away from the openings of the ejection hatch for accommodating a displacement of the trash bag 30.

It is important to note that while both the hatch covers 22 and 26 can concurrently be seated in a hatch-sealing relationship, relative to the openings of their respective hatches, it is important to note that only one of the hatch covers can at any given instant be disposed in a hatch-opening disposition wherein the cover is displaced out of the hatch-sealing relationship. This is necessitated by the fact that should both of the hatch covers 22 and 26 concurrently be unseated, the cabin enclosure would be evacuated substantially instantaneously, thus initiating a disturbance of catastrophic proportions within the enclosure. Therefore, each of the hatch covers is supported for initial displacement from its hatch-sealing disposition only in the presence of a zero pressure differential established thereacross. It should therefore be apparent that the pressure within the chamber 27 must alternately be varied in order to accommodate an opening of the hatches 20 and 24 for inserting and discharging objects of waste.

In order to achieve a variable pressurization of the chamber 27 of the airlock 10, in order to accommodate an opening of the hatch covers 22 and 26, a pressure control system 40 is interconnected with the manually operable hatch-deploying mechanism 34 employed in manually deploying the cover 26 of the ejection hatch 24.

The system 40, in effect, is a three-way system ported to both the vacuum of space and the pressure of the cabin as well as the to the 27 of the airlock. Thus by manipulating the system 40, the chamber 27 is placed in communication with the vacuum of space or, alternatively, with the pressure of the cabin of the vehicle. It is therefore to be understood that, in practice, the pressure of the chamber 27 cylically varies between a one atmosphere pressure of the cabin enclosure and the vacuum, or negative pressure, of space as the airlock 10 is operated for discharging objects of waste to the receptacle.

Therefore, it is to be understood that in order to accommodate a removal of the hatch cover 22 from the opening of the insertion hatch 20, the pressure within the chamber 27 initially is equalized with that of the cabin enclosure so that an equalized pressure is applied at the opposite faces of the cover 22 and, similarly, the cover 26 is removed out of its hatch-sealing disposition, relative to the ejection hatch 24, only in the presence of a vacuum applied at each of its opposite faces.

Both of these pressure conditions are established within the chamber 27 in response to a manipulation of the handle 36 as it is oscillated for deploying the hatch cover 26 to its hatch-sealing and hatch-opening dispositions.

Figures 3, 4, 5:
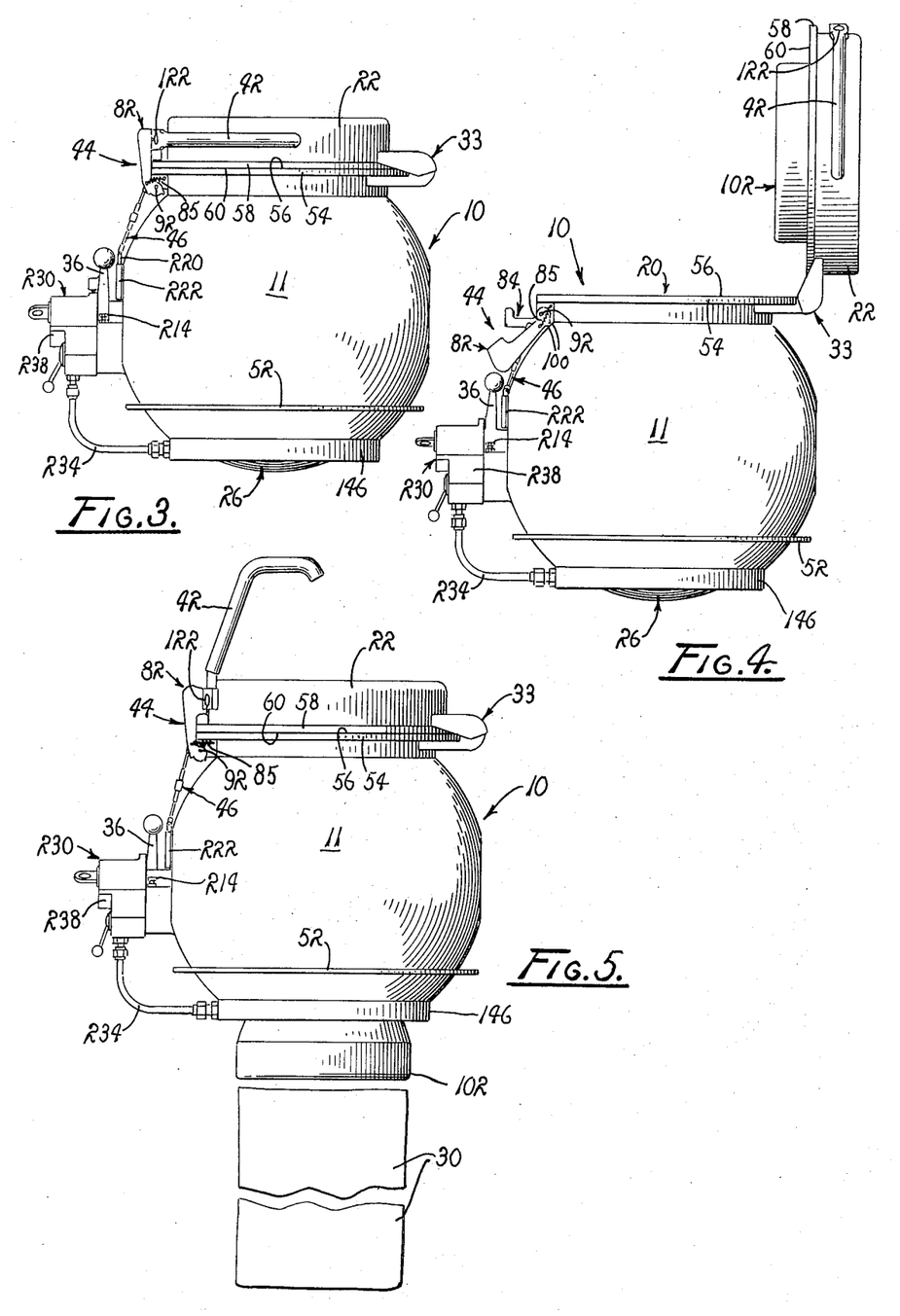
FIG. 3 is a side elevation of the airlock illustrating the airlock in a sealed configuration wherein the covers for both the insertion hatch and the ejection hatch are in their hatch-sealing disposition.
FIG. 4 is a side elevation of the airlock in a waste insertion configuration wherein the hatch cover for the insertion hatch is in its hatch-opening disposition.
FIG. 5 is a side elevation of the airlock in its waste ejection mode.

As illustrated in FIG. 3, the hatch covers 22 and 26 normally are disposed in their hatch-sealing dispositions, FIG. 3, when the airlock 10 is in its sealed configuration. In this configuration, the pressure of the chamber 27 normally is equalized with the pressure maintained within the cabin enclosure of the space vehicle. Therefore, in order to insert waste and the like into the bag 30, the cover 22 initially is pivotally deployed about the coupling 33 to its hatch-opening disposition, FIG. 4, so that access to the trash bag 30 is afforded through the insertion hatch 20. With the cover 22 redeployed to its hatch-sealing disposition, FIG. 5, the handle 36 is manipulated for initiating an operation of the hatch cover deployment mechanism 34 for thereby deploying the cover 26 to its hatch-opening disposition. As will hereinafter be more fully described, initial motion of the handle 36 serves to actuate the pressure control system 40 for equalizing the pressure of the chamber 27 with that of the space vehicle's environment. This condition facilitates a lifting of the cover 26 from the opening of the ejection hatch 24 which occurs as the handle is advanced through an additional throw. Continued advancement of the handle serves to deploy the cover to its hatch-opening disposition. With the cover 26 thus deployed, the ejection ram 32 is advanced, from its seated position within the cover 22, through the cylindrical body 28 for engaging and ejecting the trash bag 30 from the chamber 27. In practice, extension of the ram 32 is effected by a rotational manipulation of an ejector handle 42 located externally of the airlock and coupled to the ram 32 through suitable linkage shown in FIG. 6.

As aforementioned, the pressure differential which exists between the cabin enclosure of the space vehicle and the celestial space environment of the vehicle serves to assure that a single hatch cover is at all times deployed in a hatch-sealing disposition relative to its associated opening. Thus the pressure differential established between the cabin enclosure and the vacuum of space is employed for rendering the airlock 10 "astronaut-proof". However, in view of the potential catastrophic conditions which are likely to occur in the event that the airlock is operated with an improper sequence, the cover 22 is secured and its hatch-sealing disposition by a manually operable latch 44 which cannot be manipulated when the system 40 is configured to port the chamber 27 to the space environment. This is achieved by coupling the latch 44 with the deployment mechanism 34 through an interlock linkage 46, hereinafter more fully described.

Additionally, an ejector interlock 48 is provided to prevent an unlatching manipulation of the latch 44 in the event the ejector ram 32 is extended from the cover 22, in order to rotect the ram from unnecessary damage, which will occur should the cover 22 be deployed while the ram is extended. Through the ejector interlock 48 cremen are assured that the ram 32 is seated in an unobtrusive disposition, within the cover 22, before the cover is deployed to its hatch-opening disposition.

Accordingly, it is to be understood that through the pressure differential of the pressures within the cabin enclosure of the space vehicle and its celestial space environment, and the interlocks 46 and 48 an ordered sequence of steps is required in order to utilize the airlock in its intended manner. Thus, an accidental depressurization of the cabin enclosure during the disposal of objects of waste is avoided for protecting crewmen aboard the space vehicle.

Airlock

The airlock 10 preferably is fabricated to the smallest dimensions practical in view of its intended function and is, in practice, designed to accommodate pressures within the range of pressures normally experienced during the launching of a space vehicle, as well as the pressures encountered during a mission. The shell 11 of the airlock 10 includes a pair of hemispheric forgings assembled utilizing currently available machining and welding techniques. The particular material from which the shell 11 is fabricated, of course, is a matter of convenience and is dictated by parameters imposed in accordance with its intended use.

In practice, a mounting flange 52, of an annular configuration, is provided externally of the shell 11 and is employed in mounting the shell on the jamb 12. However, it is to be understood that the particular manner in which the shell 11 is coupled with the jamb 12 is a matter of convenience only so long as the shell 11 is hermetically sealed with the jamb 12 adjacent to the opening 14 in order to preclude an exchange of pressures between the receptacle and the cabin enclosure.

The insertion hatch 20 includes an annular opening 53 circumscribed by a radially extended, annular lip 54 having a planar face 56 machined thereon. The face 56 is employed as a sealing surface against which the insertion hatch cover 22 is seated when deployed in its hatch-sealing disposition relative to the opening 53.

Figure 19:
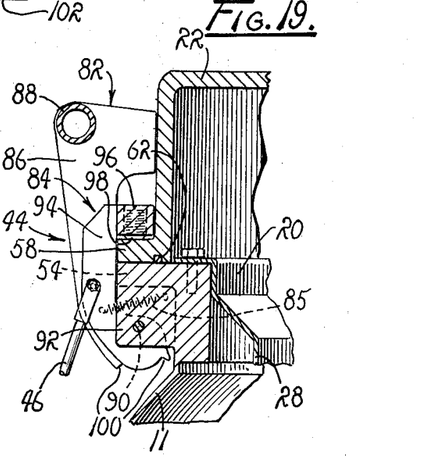
FIG. 19 is a fragmentary view, partially in section, taken generally along line 19—19 of FIG. 18.
Figure 20:
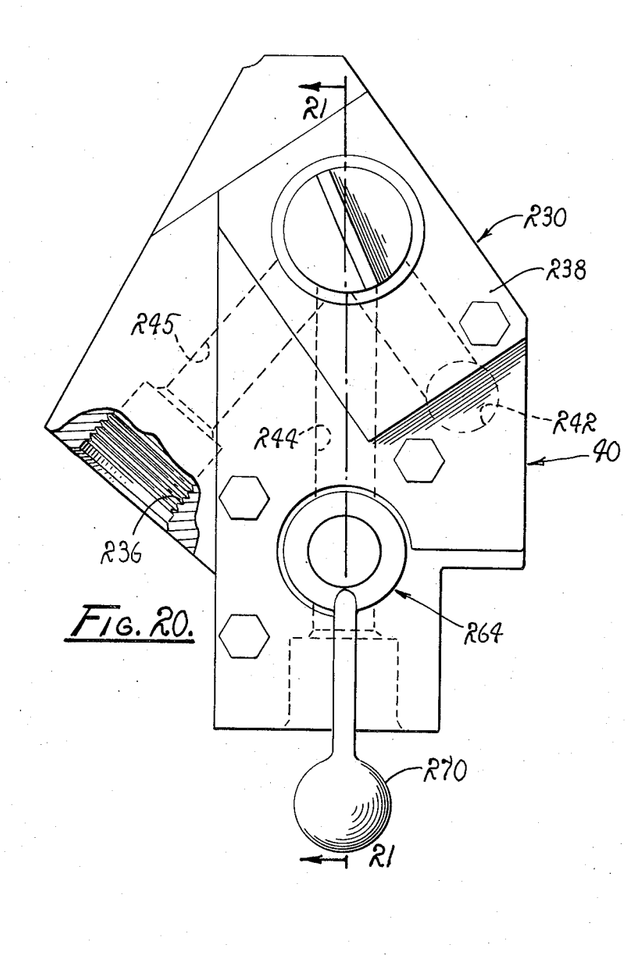
FIG. 20 is an enlarged view of a pressure control valve employed in varying pressures within the airlock.

In order to assure that a hatch-sealing disposition is established between the cover 22 and the face 56 of the lip 54, the cover 22 also is provided with an annular lip 58 having a face 60 which mates with the face 56 of the lip 54. As a practical matter, an annular seal 62, FIG. 19, is seated within an appropriately formed groove, not designated, formed in the face 60 in order to assure that an effective hermetic seal is established between the faces 56 and 60. While the seal 62 can be formed of any suitable material, a silicone rubber seal of an annular configuration preferably is employed.

Figure 6:
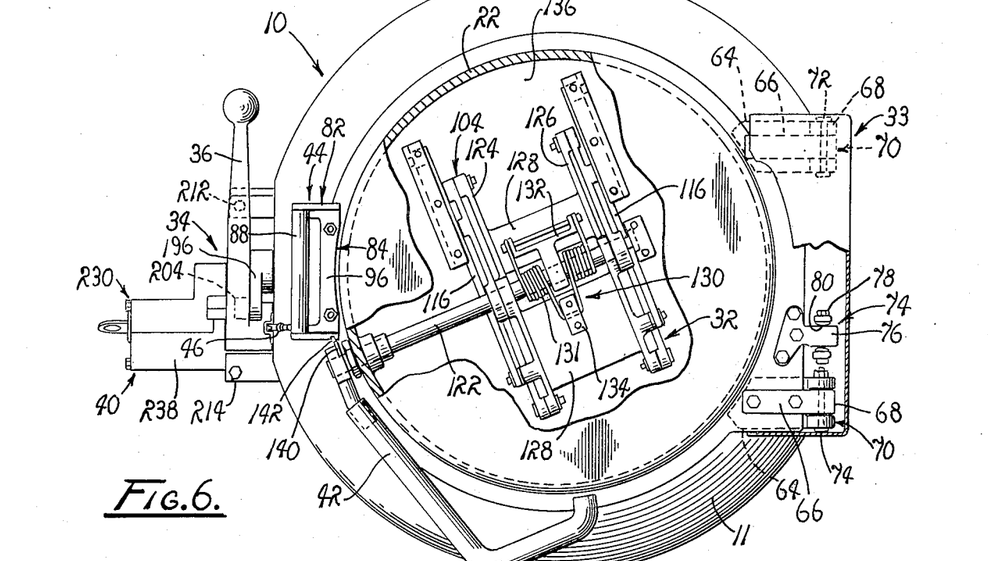
FIG. 6 is a top plan view of the airlock, partially broken away for illustrating a torsion spring employed in retracting the ejection ram.
Figure 7:
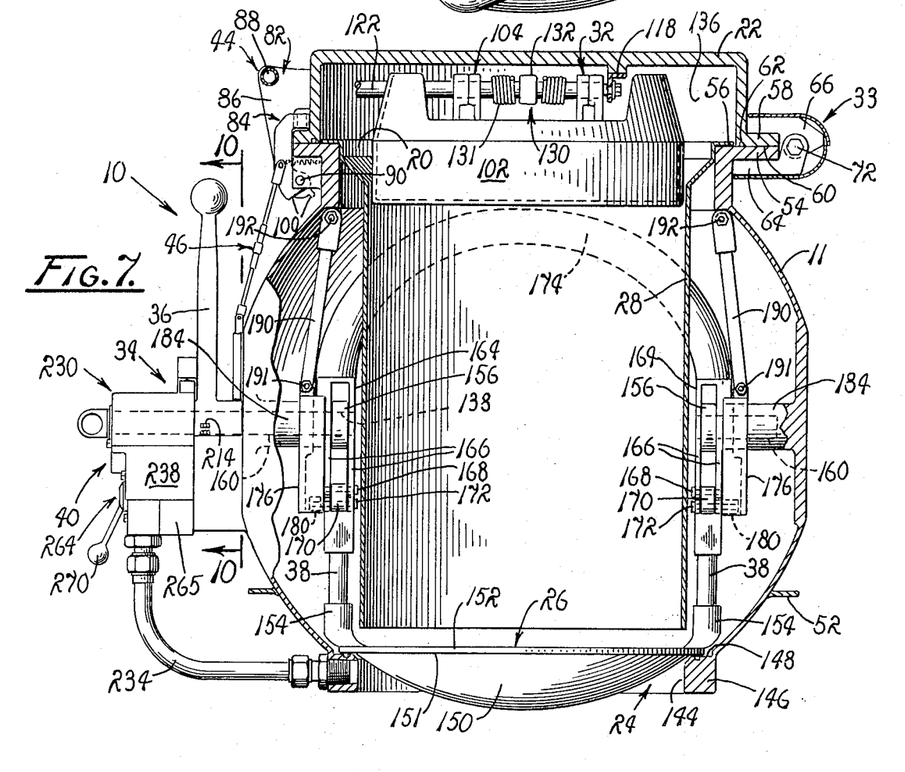
FIG. 7 is a cross-sectional elevation of the airlock, illustrating the ejection ram in a fully retracted disposition relative to the hatch cover of the insertion hatch.

As illustrated in FIGS. 6 and 7, the cover 22 is coupled with the shell 11 through the coupling 33 which includes a pair of hinge brackets 64 fixed to the lip 54, and a pair of hinge brackets 66 secured to the lip 58 of the cover 22. In practice, the brackets 64 and 66 terminate in coupling components 68 disposed in coaxial alignment for thereby establishing a pair of coaxially related clevis couplings 70. Each of the clevis couplings 70 includes a pivot pin 72 extended therethrough and secured in place by an suitable means including nuts, pins and the like, not designated.

Also mounted on the lips 54 and 58 is a Belleville brake assembly, generally designated 74. Since such brake assemblies are well known, a detailed description of the assembly 74 is omitted in the interest of brevity. However, it is to be understood that the assembly 74 includes a brake block 76 having components suitably fixed to the lips 54 and 58 coupled together through a splined pin 78 upon which is mounted a plurality of Belleville washers 80 disposed in face-to-face, frictional engagement. Hence, as the cover 22 is pivotally displaced about the pivot pins 72, the washer 80 serve to retard pivotal displacement of the cover so that its displacement toward its hatch-sealing disposition is inhibited in order to prevent an undesired rapid closing of the cover.

Figure 8:
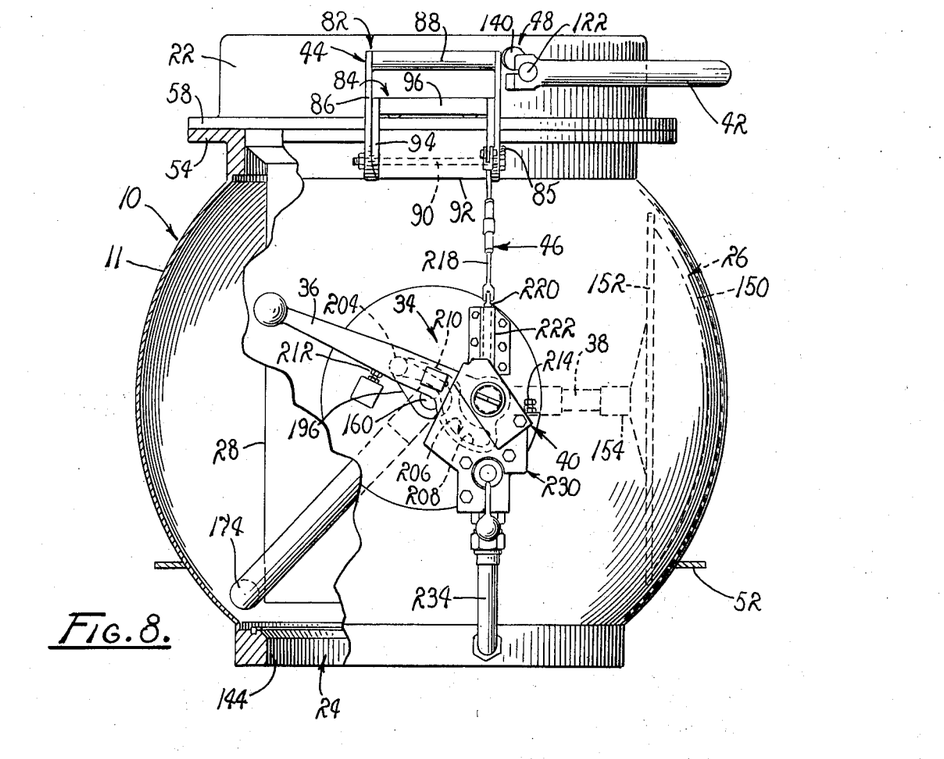
FIG. 8 is a partially sectioned front elevation of the airlock illustrating a position assumed by a hatch-deploying mechanism including a normally operable handle utilized in deploying the ejection hatch cover, when the ejection hatch cover is deployed to its hatch-opening disposition.

The latch 44 includes a handle, generally designated 82, and a latching tongue, generally designated 84, biased into an operative position by a tension spring 85, FIG. 8. The handle 82 includes a pair of laterally spaced, parallel support arms 86 coupled together through a transversely oriented handle-grip 88. The handle 82 is pivotally coupled with the shell 11 by a pivot pin 90 extended therethrough and through a coaxially related bore, not designated, extended through a support block 92 integrally related to the shell 11.

The latching tongue 84 also includes a pair of parallel support arms, designated 94, pivotally supported by the pivot pin 90. In practice, the parallel support arms 94 are joined together by transversely oriented pressure plate 96 having seated herein resilient pressure pads 98. The pads 98 perform a wedging function for wedging the face 60 into sealing engagement with the face 56 for thereby establishing an hermetic seal therebetween.

It is important here to note that the handle 82 and the latching tongue 84 are each provided with stops 100, FIG. 7, arranged in a coplanar relationship. Accordingly, the handle 82 is afforded a limited displacement relative to the latching tongue 84 until such time as the stops 100 are brought into abutting engagement. Therefore, it is to be understood that the latch 44 is manipulated by gripping the handle grip 88 and imparting motion thereto sufficient for bringing the stops 100 into an abutting engagement, whereupon continued displacement of the handle 82 serves to impart rotational displacement to the latching tongue 84.

Figure 17:
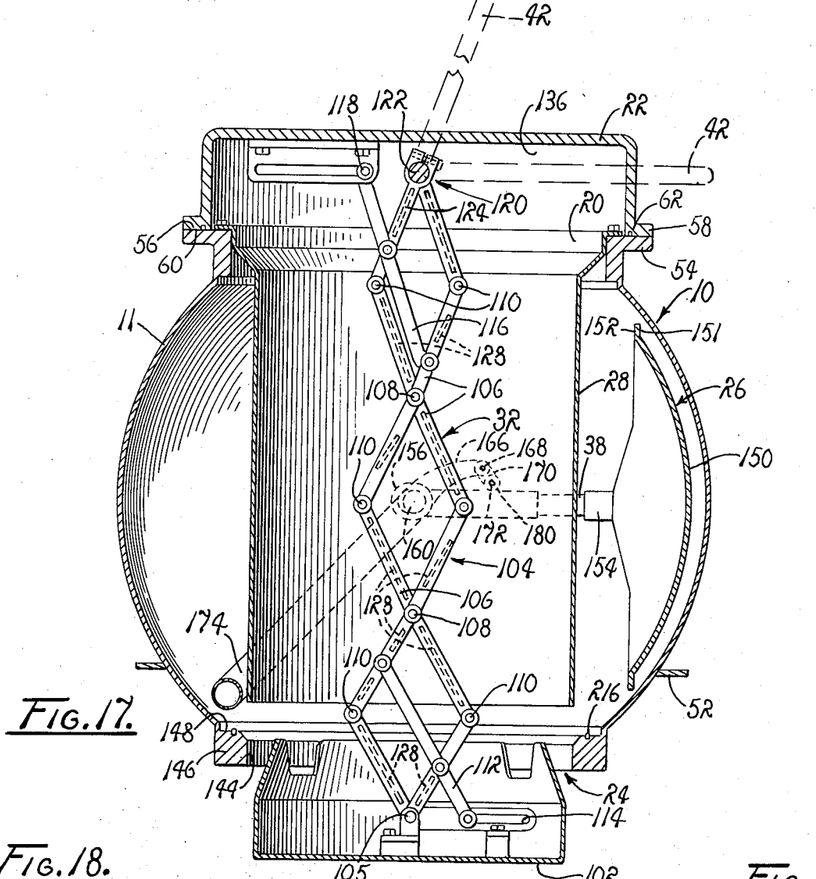
FIG. 17 is a cross-sectional view of the airlock illustrating the ejector ram in a fully extended disposition, relative to the cover for the insertion hatch, assumed in ejecting the trash bag.

Turning now to FIG. 17, the ejection ram 32 includes a substantially disk-shaped head 102 supported by a lazy-tong linkage 104 coupled therewith at a pivot 105. For reasons well understood by those familiar with lazy-tong linkages, the linkage 104 includes a plurality of short links 106 pivotally coupled near their center at central pivots 108 and pivotally coupled at terminal pivots 110 located at the opposite ends thereof. Since the operation of lazy-tong linkages is well understood, a detailed description is omitted in the interest of brevity. However, it is to be understood that by displacing the links 106 toward a parallel relationship, in a direction extending axially from the cover 22, the ram 32 is extended, and by displacing the links 106 toward a parallel relationship, radially related to the cover 22, the ram 32 is retracted for retracting the head 102 toward the hatch cover 22.

As a practical matter, stability is imparted to the head 102 through a supporting linkage including a link 112 projected from one of the links 106 and forming a bifurcated base for the linkage 104. A terminal cam roller is fixed to the distal end of the link 112 and is seated in a cam slot 114 for accommodating lateral displacement of the distal end of the link 112 relative to the pivot 105, while imparting stability thereto. The lazy-tong linkage 104 is provided, at its opposite end, with a similar supporting linkage, including a link 116 terminating in a cam and slot coupling 118, for imparting stability to the ram 32 while accommodating an extension and retraction of the linkage 104 as it is extended and retracted in a manner consistent with that characterizing lazy-tong linkages.

The lazy-tong linkage 104 is driven through a drive coupling 120, by the ejector handle 42. The drive coupling 120 includes a transversely oriented shaft 122 pivotally supported at opposite sides of the cover 22, coupled with the handle 42, and fixedly secured to only one end of one of the links 106, in a manner such that oscillatory rotation of the handle 42 imparts a responsive oscillating motion to the attached link 106 for thus angularly displacing the distal end of that link relative to its adjacent counterpart for this imparting the desired lazy-tong motion to the linkage. Of course, suitable seals are provided for hermetically sealing the shaft 122 relative to the hatch cover 22.

As a practial matter, the lazy-tong linkage 104 is provided with a pair of coplanar legs 124 and 126, FIG. 6, of similar design. The legs are suspended from the shaft 122 and are interconnected through a plurality of parallel, mutually spaced support bars 128 through which lateral stability is imparted to the linkage 104. A torsion coupling 130 is provided for continuously urging the ram 32 into a retracted disposition relative to the cover 22. This coupling includes a torsion spring 131 wound about the shaft 122 and fixed thereto by an extended bracket 132 as well as being fixed to the internal surface of the cover 22 through a convenient coupling 134, for continuously biasing the lazy-tong linkage 104 into a retracted configuration. As illustrated in FIG. 7, the cover 22 is configured to include an open-faced compartment 136 into which the ram 32 is retracted for stowage, and from which the ram 32 is extended for ejecting trash bags 30 from the airlock 10.

Figure 18:
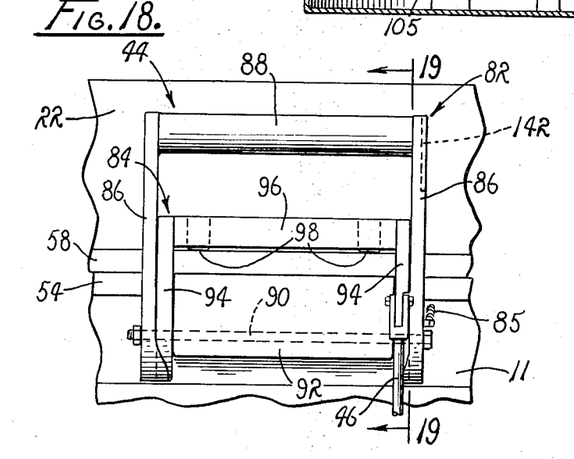
FIG. 18 is a fragmentary view of a latch employed in latching the insertion hatch cover in its hatch-sealing disposition.

For reasons aformentioned, it is imperative that the ram 32 be fully retracted and seated within the cover 22 before is is pivotally deployed to its hatch-opening disposition. Consequently, the interlock 48 includes a protruding, arcuate interlock tab 140 extended from the ejection handle 42, adjacent to the shaft 122, configured to be received within a slot-like opening 142, FIG. 18, formed in an adjacent surface of a support arm 86 of the handle 82, provided for the latch 44. The slot 142 and tab 140 are so related that the tab 140 seats within the slot 142 as the handle 42 is rotated a distance sufficient to initiate an extension of the ram 32. Consequently, the handle 82 of the latch 44 is free for rotational displacement, about the pivot pin 90, only so long as the handle 42 is positioned for seating the ram 32 in its retracted condition within the compartment 136. This, of course, serves to prohibit an accidental or an unintentional displacement of the handle 82 about the pivot pin 90 in order to prevent an accidental or an unintentional displacement of the latching tongue 84 against the bias of the spring 85, for thereby inhibiting a release of the cover 22 from its hatch-sealing disposition.

Turning again to FIG. 2, the ejection hatch 24 includes an opening 144 defined by an annular jamb 146 through which the trash bag 30 operatively is ejected as the ram 32 is extended. In practice, the jamb includes a planar face 148, FIG. 7, which is machined to receive in sealing engagement the periphery of the hatch cover 26 for thereby establishing therebetween an hermetic seal.

The hatch cover 26 for the ejection hatch 24 is of a circular configuration and, preferably, includes a concave central portion 150. This cover is provided with a peripheral sealing surface 150, opposite the face 148, and provided by an annular lip 152 radially extended from the central portion of the cover.

The cover 26 is coupled with the end portions of the links 38 through any suitable means, including a pair of laterally spaced, internally threaded sleeves 154 fixed to the lip 152 for screw-threadingly receiving the ends of the links in a manner such that the links 38 are adjustably coupled with the cover 26.

Each of the links 38 terminates in an elongated eye 156 vertically spaced from the cover 26. Within the eyes 156 there is received a pair of coaxially related pivot pins 160 about which the links are oscillated as the cover 26 is advanced along the aforementioned arcuate segment of the path extending away from the ejection hatch. Due to the elongation of the eyes 156, the links 38 also are afforded rectilinear motion, relative to the pivot pins 160, in order to accommodate a linear displacement of the cover 26, as it is advanced along the aforementioned linear segment of the path extending away from the ejection hatch 24. It is to be understood, therefore, that the elongated eye 156 accommodate the desired displacement of the cover 26 as it is advanced along its segmented path of deployment.

Figures 10, 15, 16:
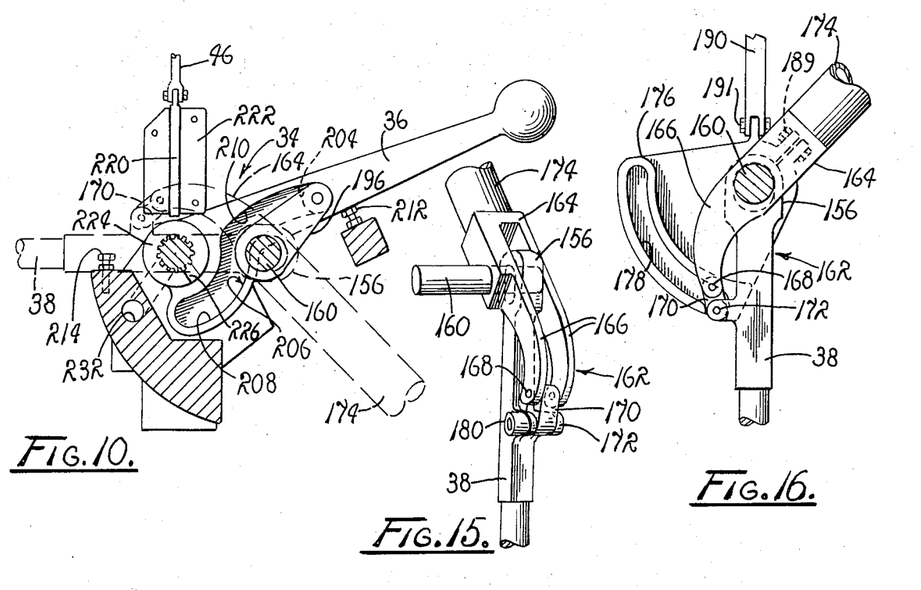
FIG. 10 is a fragmentary view, taken generally along line 10—10 of FIG. 7, when the ejection hatch is deployed as illustrated in FIG. 8.
FIG. 15 is a detail view of lifting linkages shown in FIG. 14 utilized in deploying the ejection hatch cover.
FIG. 16 is another detail view of the linkage shown in FIG. 15.
Figure 14:
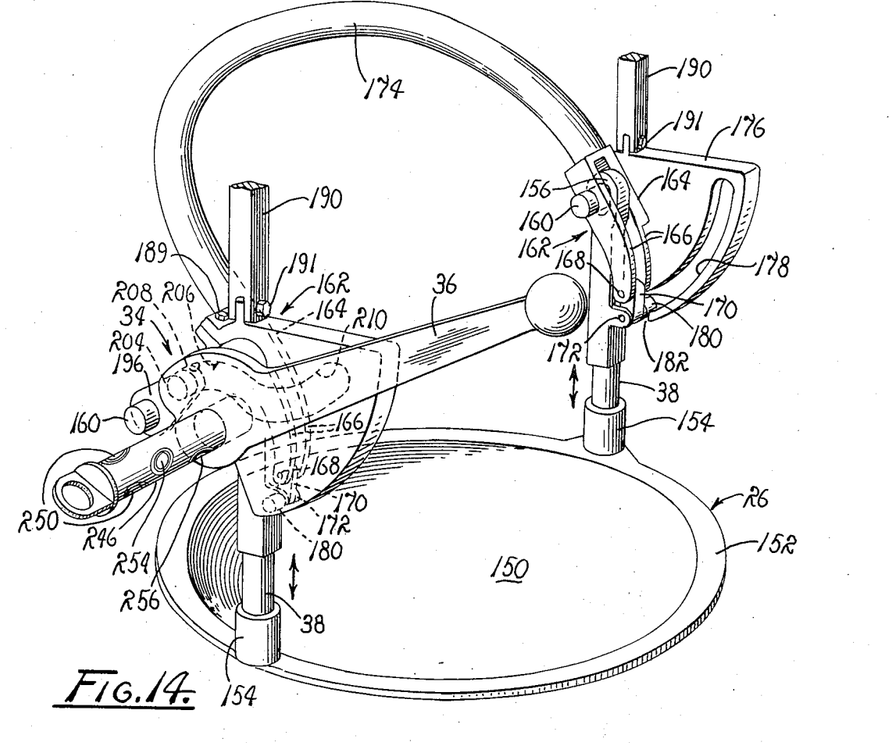
FIG. 14 is a prespective, fragmentary view of the hatch-deploying mechanism utilized in deploying the cover for the ejection hatch.

Motion is imparted to the links 38, simultaneously, by means of an oscillating drive unit, generally designated 162, FIG. 14. The drive unit 162 includes a pair of yokes 164 also supported for oscillatory motion by the pivot pins 160. As best shown in FIGS. 15 and 16, each of the yokes 164 includes a pair of mutually spaced legs 166 between which is inserted the uppermost or distal end of one of the links 38 so that the elongated eyes 156 are received by the pivot pins 160 as the eyes are seated between the legs 166 of the yoke 164. Each of the yokes 164 terminates in a clevis coupling 168 and is there pinned to a pivot link 170. Each of the links 170, in turn, is pivotally coupled, at its opposite end, with one of the links 38 at a suitble coupling 172. It should therefore be apparent that as the pair of yokes 164 are pivotally oscillated about the pivot pins 160, the links 38 are displaced in a continuous motion having both linear and oscillatory motion components, imparted thereto through the pivotal links 170.

As a practical matter, the yokes 164 are coupled into a unitary pair through an arcuate bail 174 which circumscribes the body 28 and functions as a motion transmitting link through which a motion simultaneously is imparted to the links 38. Precise control of the motion imparted to the links 38 is desirable in order to precisely control movement of the cover 26. Therefore, a pair of coplanar cam plates 176 is provided within the chamber 27, at opposite sides of the cylindrical body 28. Each of the cam plates 176 includes an arcuate slot 178 within which is seated a cam roller 180, FIG. 22. Each of the cam rollers 180 is pinned to one of the links 38 in coaxial alignment with the pin of the coupling 172. Furthermore, it is to be understood that the cam rollers 180 are in mutual coaxial alignment so that the motion imparted to the links 38, through the bail 174, is similar to direction and magnitude.

As illustrated in FIGS. 14 and 16, the couplings 168, at the distal ends of the yokes 164 will each describe an arc, when the yokes 164 are pivotally displaced. Furthermore, these arcs are substantially coincident with the arc of the slot 178. Therefore, the cam rollers 180 are drawn along the slots 178 by the pivotal links 170, for thereby imparting angular displacement to the links 38 in order to displace the cover 26 along the aforementioned arcuate segment of the path of deployment.

However, in order to accommodate displacement of the cover 26 along the linear segment of the path, the slots 178 are provided with terminal reliefs 182 in order to accommodate a rectilinear motion of the cam rollers 180, prior to the cam rollers being advanced along paths defined by the arcuate slots 178. It should be readily apparent that by pivotally displacing the yokes 164, the cam rollers 180 initially are advanced upwardly through the reliefs 182, of the slots 178, and subsequently are advanced along arcuate paths defined by the opposed surfaces of the slots 178. Thus, as the yokes are displaced, an initial linear motion simultaneously is imparted to the lifting links 38 for thereby lifting the sealing surface 151 of the lip 152 from sealing engagement with the face 148 of the jamb 146 of the hatch 24. Additional angular displacement of the yokes 164 causes the pivotal links 170 to draw the cam rollers 180 along the slots 178 for imparting angular displacement to the links 38. Since the bail 174 serves to assure that simultaneous motion is imparted to the links 38, the cover 26 is advanced along its segmented path of deployment, free from encounter with internal surfaces of the airlock.

Figures 9, 11, 12, 13, 22:
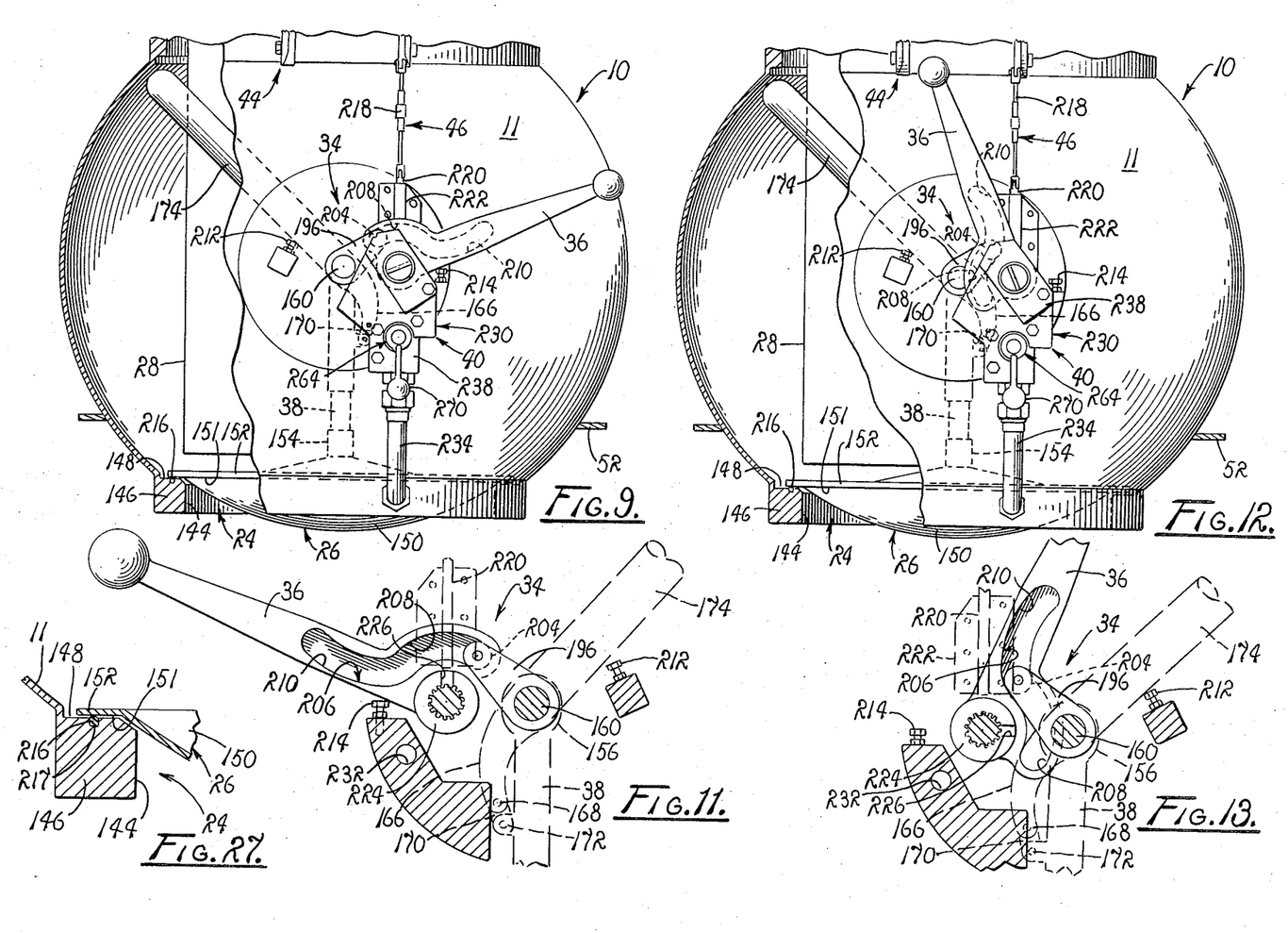
FIG. 9 is a partially sectioned view illustrating a position assumed by the mechanism shown in FIG. 8 when the ejection hatch cover is deployed in its hatch-sealing disposition.
FIG. 11 is a fragmentary view, similar to the view of FIG. 10, illustrating the position assumed by the mechanism utilized in deploying the cover for the ejection hatch when the cover is in its hatch-sealing disposition.
FIG. 12 is a partially sectioned view of the airlock illustrating the intermediate position assumed by the hatch-deploying mechanism utilized in deploying the cover for the ejection hatch cover when the mechanism has been manipulated for pressurizing the airlock to ambient pressure, prior to deploying the ejection hatch cover.
FIG. 13 is a fragmentary view of the hatch-deploying mechanism when the mechanism is in its intermediate position, as illustrated in FIG. 12.
FIG. 22 is a partially sectional view taken of the pressure control valve illustrating its operative relationship with the hatch-deploying mechanism.

As a practical matter, the shell 11 of the airlock 10 is provided with a pair of internal, diametrically opposed collars 184, FIGS. 7 and 22, disposed in substantially coaxial alignment within the chamber 27. Each of the collars 184 includes a bore defining a tubular bearing surface 186 for supporting one of the pivot pins 160. In practice, the collars 184 are integral with the shell 11 and receive about their distal ends openings 188 formed in the cam plates 176. In practice, openings 188 of the cam plates 176 define split-ring openings through which the plate 176 are secured to the collars 184, with the aid of suitable clamping screws 189. Thus, the bore of each of the collars 184 serves to support one of the pivot pins 160, while a cam plate 176 is externally supported by the collar in an operative disposition relative to a cam roller 180. As a practical matter, each of the cam plates 176 is secured against rotation relative to the collar 184 through a strut 190 having one end pinned to the cam plate at a coupling 191 and the opposite end thereof pinned to the shell 11 at a suitable coupling 192.

Oscillatory rotation is imparted to the yokes 164 through a motion imparted to one of the pivot pins 160 to which one of the yokes 164 is pinned. In practice, pins 194, only one of which is shown in FIG. 22, are extended radially through the pivot pins 160 and are seated at their opposite ends in the yoke 164 so that rotation imparted to either of the pivot pins 160 is, in turn, imparted to both the yokes 164 through the bail 174.

Rotation is imparted to the pivot pins 160 through a radially extended drive link 196 pinned to one of the pivot pins 160 by a suitable coupling pin 198, similar in design to the coupling pin 194. The drive link 196 is mounted on the pivot pin 160 externally of the shell 11 thus requiring the pivot pin 160 to extend through the shell 11. In practice, a plurality of suitable sealing devices 200 are provided for hermetically sealing the pivot pin 160 within the tubular bearing surface 186.

The drive link 196, as best illustrated in FIGS. 11 through 13, serves as a motion input arm for imparting oscillatory rotation to the pivot pin 160 as opposed angular displacement is imparted thereto. In order that angular displacement is imparted to the drive link 196, the link 196 is coupled with the handle 36 through a cam roller and slot coupling 202. The coupling 202 preferably includes a cam roller 204 pinned to the distal end of the drive link 196 seated within a slot 206. The slot 206 is of a substantially ogee or S-shaped configuration and is extended along the handle 36 so that by oscillating the handle 36, oscillatory motion is imparted to the pivot pin 160, as the cam roller 204 is caused to advance along the slot 206 in response to the motion imparted to the handle 36.

For reasons which will hereinafter become more apparent, the specific configuration of the slot 206 is employed to accommodate so-called lost motion as the handle 36 is advanced from an initial position, illustrated in FIG. 9, to a midpoint position, depicted in FIG. 12, while 90° of angular displacement is imparted to the drive link 196 as the handle 36 is advanced from the midpoint position illustrated in FIG. 12 to a final position, depicted in FIG. 8, for thus lifting and then rotating the ejection hatch cover 26 through 90° of rotation.

In order to achieve the desired lost motion, the slot 206 is provided with a first arcuate segment 208 concentric with the pivotal axis of the handle 36, FIG. 11, and a reversed arcuate segment 210 concentric about a point eccentric to the pivotal axis of the handle. Therefore, as the handle 36 is rotated about its pivotal axis from the position depicted in FIG. 11 to that illustrated in FIG. 13, no motion is imparted to the drive link 196, due to the arcuate configuration of the slot segment 208 and its concentricity with the pivotal axis. However, continued angular displacement of the handle 36 causes the cam roller 204 to enter and progress along the segment 210, whereupon the motion of the handle 36 is multiplied and transmitted to the pivot pin 160, as the roller 204 advances along a slot segment 210 to the final position illustrated in FIG. 10. Of course, a reversed angular displacement of the handle 36 causes the cam roller 204 to retrace its path.

Thus, the handle 36 is permitted to rotate to the extremity of its throw, while angular displacement of the pin 160 is coincident with only a predetermined portion of the throw. The throw of the handle 36 is limited by a pair of adjustable, scre-threaded, motion-limiting stops 212 and 214 suitably sounted externally of the shell 11 in the path of the handle 36. Since the stops 212 and 214 can be adjusted, a precise throw for the handle 36 can accurately be established.

Referring now specifically to FIGS. 8 through 13, it will be noted that in FIG. 8 the cover 26 is deployed to its hatch-opening disposition while in FIGS. 9 and 12, the cover 26 is in its hatch-sealing disposition. As illustrated in FIG. 8, the handle 36 is seated against the top 212 and the cam roller 204 is bottomed in the slot segment 210, as also shown in FIG. 10. In this position, the cover 26 is deployed to its hatch-opening disposition. In order to achieve this deployment, angular displacement is imparted to the handle 36, about its pivotal axis, for causing the cam roller 204 to advance along the slot segment 208, as depicted in FIGS. 12 and 13. No angular displacement is transmitted to the pivot pin 160, due to the shape of the segment 208. However, as the cam roller 204 enters the segment 210 of the slot 206, angular displacement immediately is imparted to the link 196 for thereby imparting rotation to the pivot pin 160.

Initially, the displacement of the link 196 causes the links 38 to advance in a linear direction, for thus lifting the cover 26 from the opening 144 of the ejection hatch 24. Of course, a simultaneous displacement of the links is assured through the motion imparted to the motion transmitting bail 174. As the links 38 are advanced away from the opening of the hatch 24, with linear motion, the roller 180 enters the arcuate slot 178 and thereafter follows the clevis coupling 168, along an arcuate path for thus imparting angular displacement to the links 38, about the pivot pins 160, for thus displacing the cover 26 to the position depicted in FIG. 8, as the handle 36 comes to rest against the stop 212. In order to close the cover 26 oppositely directed displacement is imparted to the handle 36 so that the cover 26 is caused to retrace its path to the opening 144 of the hatch 24.

Of course, it is important that as the cover is seated, an hermetic seal must be established between the periphery of the cover 26 and the face 148 of the jamb 146. Accordingly, a soft rubber seal 216, FIG. 27, is formed in an annular slot 217 and extends slightly above the face 148 in order to enhance the establishment of an hermetic seal therebetween.

As hereinbefore mentioned, it is imperative that only one of the covers 22 and 26 be unseated from its hatch-sealing disposition at any given instance. Accordingly, the interlock linkage 46 includes an adjustable link 218 having a turnbuckle, not designated, through which its length is adjusted, and an interlock bolt 220 seated for rectilinear motion within a housing 222. The link 218 is pivotally coupled to the latching tongue 84, of the latch 44, so that a reciprocating motion is imparted to the link as the tongue 84 is pivoted to a released relationship with respect to the cover 22. The interlock bolt 220 is pivotally coupled to the link 218 and is seated within a housing 222 fixed to the shell 11 in a radial alignment with a lock-ring 224. The lock-ring 224, in practice, is integral with the handle 36, FIG. 11, and is concentric with the pivotal axis of the handle so that the ring, in effect, is oscillated about the pivotal axis of the handle 36 as the handle is angularly displaced for imparting motion to the cover 26.

Within the lock-ring 224 there is a machined radial slot 226 which is so positioned as to be aligned with the interlock bolt 220, when the handle 36 is seated against the stop 214, FIGS. 9 and 11, and the cover 26 is in its hatch-sealing disposition, relative to the opening 144. Therefore, the bolt 220 is afforded displacement into an interlocking relationship with the radial slot 226, only when the handle 36 is fully seated against the stop 214 and the cover 26 is fully seated against the seal 216. Thus, motion of the link 218 is accommodated for permitting the latching tongue 84 to be pivotally displaced about the pivot pin 90. Of course, once the bolt 220 seats in the slot 226 motion of the handle 36 is arrested, until such time as the bolt is withdrawn. Withdrawal of the bolt 220 is effected simply by repositioning the latching tongue 84 into its cover-arresting position.

Hence, the cover 26 is mechanically latched into its hatch-sealing disposition when the latching tongue 84 is displaced for releasing the cover 22 from its hatch-sealing disposition. Furthermore, the latching tongue 84 is supported against displacement, from its cover latching position, by the linkage 218 when the handle 36 has been displaced a distance sufficient to effect a non-alignment of the bolt 220 and radial slot 226. Accordingly, it is to be understood that through the interlock 46 it is assured that only one of the covers 22 and 26 will, in operation, be displaced from its hatch-sealing disposition.

Pressure Control System

As hereinbefore mentioned, a variable pressurization of the chamber 27 of the airlock 10 is effected through a selective porting of the pressure control system 40.

Figure 21:
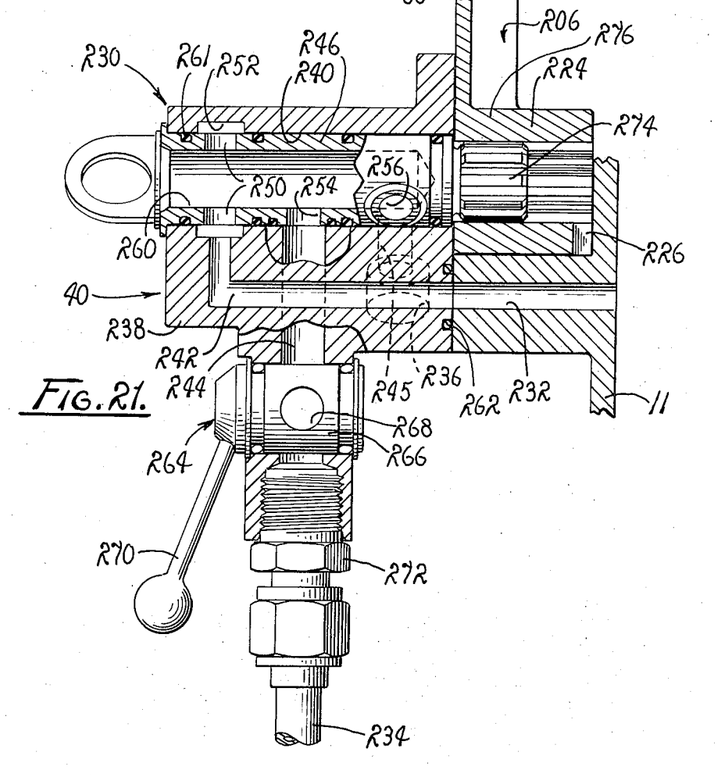
FIG. 21 is a cross-sectional view, taken generally along line 21—21 of FIG. 20.
Figure 22:
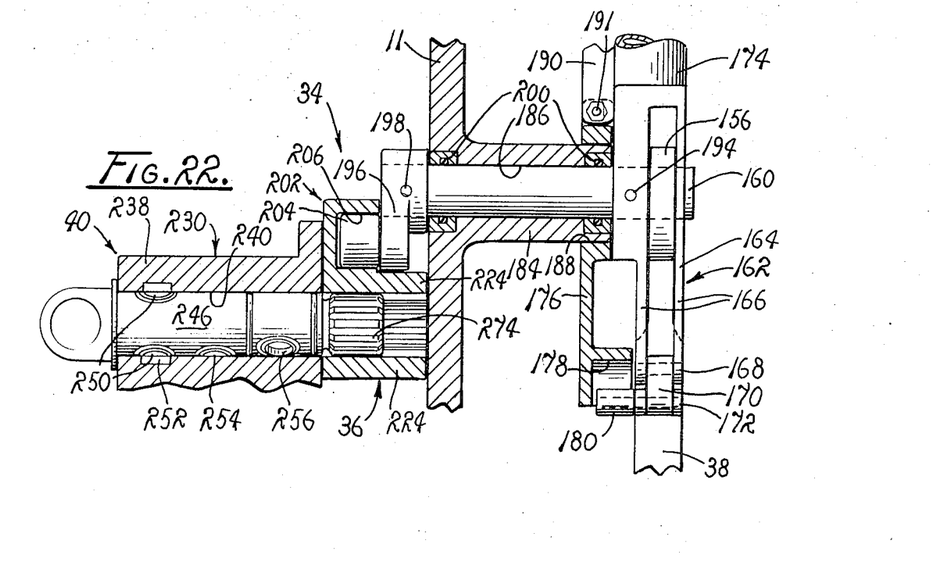

The pressure control system 40 includes a three-way selector valve 230 ported to the chamber 27, through a suitable pressure conduit 232, the vacuum of space, through a pressure conduit 234, and to the cabin enclosure through a pressure port 236, FIG. 21. The valve 230 is of known design and includes a housing 238 having a bore 240 extending therethrough and communicating with the conduit 232, through a suitably formed channel 244, and to the port 236 through a channel 245. The housing 238 is mounted externally of the shell 11 with the longitudinal axis of the bore 240 being eccentrically related to the longitudinal axis of the pivot pin 160 and in parallelism therewith, while coincident with the pivotal axis of the handle 36.

Mounted for rotation within the bore 240 is a valving spool 246 of a cylindrical configuration. The spool 246 includes an annular array of pressurization ports 250 circumscribed by an annular chamber 252 in direct communication with the channel 242 so that pressures delivered through the pressurization ports 250 are at all times directed through the channel 242 to the conduit 232 whereupon the chamber 27 is pressurized in accordance with the pressure delivered to the ports 250.

The spool 246 further includes a vacuum port 254 and an angularly related positve pressure port 256, each of which, in turn, communicates with the pressurization ports 250 through an internal bore 260 extended axially through the spool 246 and sealed at its opposite ends. The vacuum ports 254 is so positioned as to be brought into coaxial alignment with the channel 244 through a selected angular displacement of the spool 246, while the port 256 is positioned to be brought into coaxial alignment with the channel 245, through another angular displacement of the spool so that the channel 244 and 245 sequentially communicate with the channel 242 through the bore 260 and the pressure ports 250.

In practice, each of the ports formed within the spool 246 is hermetically sealed by an O-ring seal 261 seated in a groove concentrically related to the port in order to preclude a passage of the pressure about the external surface of the spool. Furthermore, it is to be understood that the spool 246 is appropriately supported whereby the channel 242 is maintained in coaxial alignment with the conduit 232. If desired, an O-ring seal 261 can be employed in establishing an hermetic seal between the housing and the shell.

Between the conduit 234 and the channel 244 there is disposed a normally-open valve 264, shown in the "off" condition in FIG. 21. The valve 264 includes a housing 265 within which is seated a rotatable spool 266. The spool 266, in turn, includes a diametrically extended bore 268 which is positionable in coaxial relationship with the channel 244 and the conduit 234 for thereby placing the valve in its normally-open condition. However, in the event it becomes desirable to seal the conduit 234, the spool 266 is rotated to its off condition by a handle 270 affixed thereto for removing the bore 268 from its alignment with the channel 244 and the conduit 234. As a practical matter, the housing 238 of the three-way valve 230 is relieved to receive therein the housing 265 of the valve 264, the conduit 234 is coupled with the valve 264 through a suitable screw-threaded union 272.

The spool 246 is provided with a splined extension 274 protruding from the bore 240. This extension receives, in splined engagement, a hub 276 provided at the base of the handle 36 and integral with the lock-ring 224. Thus the handle 36 is supported for pivotal displacement about its pivotal axis coincident with the axis of rotation for the spool 246, whereby a pivotal displacement of the handle serves to impart rotation to the spool for thereby realigning the ports 254 and 256 with respect to the channels 244 and 245.

Figure 23:
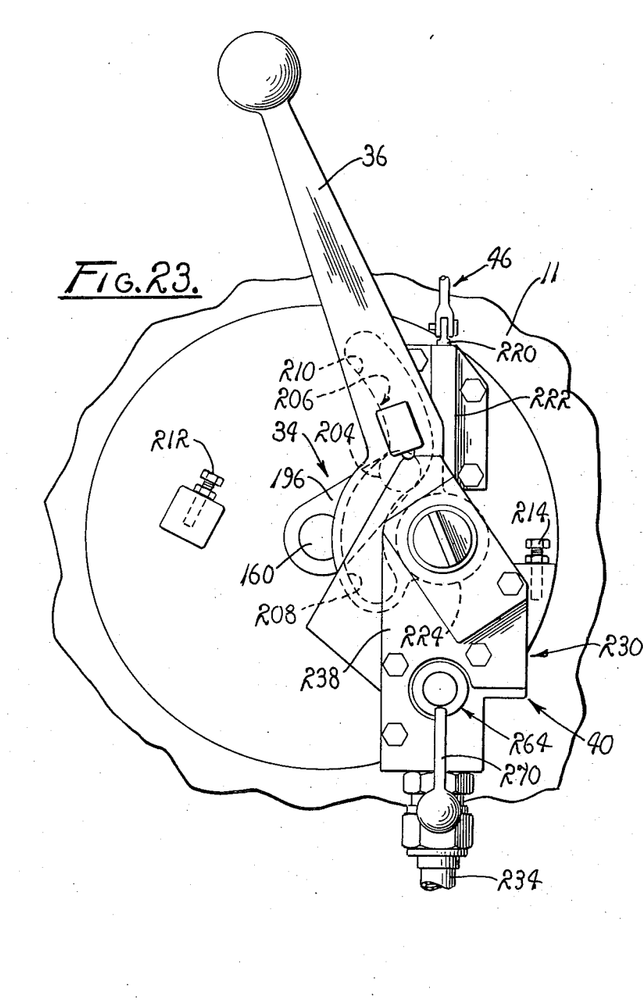
FIG. 23 is a fragmentary elevational view, on an enlarged scale, further illustrating the relationship established between the pressure control valve and the hatch-deploying mechanism.
Figure 24:
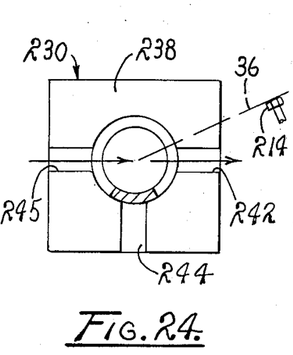
FIGS. 24, 25 and 26 are diagrammatic views collectively illustrating successive modes in which the control valve shown in FIGS. 21, 22 and 23 is employed in pressurizing the airlock.
Figure 25:
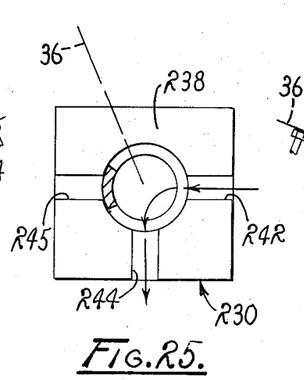
Figure 26:
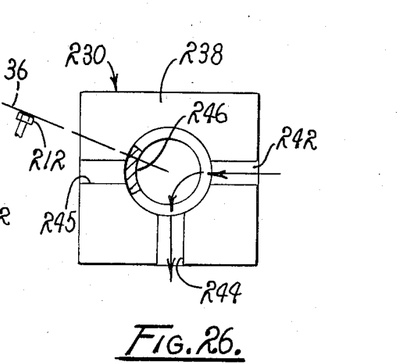

As diagrammatically illustrated in FIGS. 24 through 26, when the handle 36 is seated against the stop 214, the valve 230 establishes a communication between channels 242 and 245 whereby the chamber 27 is maintained at the one atmosphere pressure of the cabin, since the channel 244 is sealed by the spool 246. However, once the handle 36 is advanced to an intermediate position, FIG. 23, the channel 245 is sealed by the spool 246 and communication is established between the channel 242 and 244, through the port 254, for establishing a negative or vacuum pressure within the chamber 27. Continued advancement of the handle 36 will not destroy the pressurization condition thus established, even though misalignment of the port 254 with the channel 244 occurs.

It should be apparent that as the handle 36 is rotated from its position against the stop 214, FIG. 9, to the intermediate position, FIGS. 12 and 23, the spool 246 rotates through a distance sufficient for applying a negative or vacuum pressure to the chamber 27 of the airlock 10 through the channel 244 and 242, whereupon a balance of pressures across the cover 26 is effected so that continued rotation of the handle 36 results in a lifting of the cover from its hatch-sealing disposition relative to the opening 144, and continued rotation of the handle causes the cover to be displaced to its hatch-opening disposition, without altering the pressure condition established by the system 40.

Of course, a reverse motion imparted to the handle reseats the cover 26 and results in the spool 246 being rotated to its initial position for thus reversing the pressure condition established with the chamber 27, through the pressure control system 40, once the cover 26 is in its seated condition. Hence, a pressure of one atmosphere is established within the chamber 27 as the channel 242 and 245 are thus aligned and the channel 244 is sealed by a rotation imparted to the spool 246.

OPERATION

It is believed that in view of the foregoing description, the operation of the device will be readily understood and it will be briefly reviewed at this point.

With the airlock 10 operatively seated in a coupled relationship with the bulkhead 16, a crewmember, FIG. 1, readily can transfer objects of waste and the like through the bulkhead 16, to a suitable, adjacently disposed receptacle simply by manipulating the latch 44, raising the cover 22 of the insertion hatch, depositing articles of waste within a trash bag 30 supported within a cylindrical body 28 located within the shell 11, closing the cover 22, repositioning the latch 44 into a cover-arresting relationship with the cover 22, rotating the handle 36 for coupling the chamber 27 with the vacuum of space, through the pressure control system 40, lifting the cover 26 from its seat, relative to the hatch-opening 144 of the ejection hatch 24, and thereafter deploying the cover 26 in its hatch-opening disposition by a continued displacement of the handle 36. Rotation of the handle 42 serves to extend the ejection ram 32 downwardly through the cylindrical body 28 for thus ejecting the trash bag 30 through the opening 14 in the bulkhead 16, reseat the handle 42, retract the ram 32, and a subsequent reversal of the position of the handle 36 seats the handle against the stop 214. Of course, in the event that the handle 36 is improperly positioned or the ram 32 is extended downwardly from the cover 22, the latch 44 cannot be manipulated for releasing the cover 22. Should this occur, it is only necessary to reposition the handle 36 against the stop 214 or to reseat the handle 42 for retracting the ram 32, whereupon the latch 44 is released by the associated interlocks.

In view of the foregoing, it should be readily apparent that the airlock embodying the instant invention provides a practical, economic, simple and safe mechanism for transferring objects through a bulkhead separating adjacent zones of pressure.

Although the invention has been herein shown and described in what is conceived to be the post practical and preferred embodiment, it is recognized that departures may be made therefrom within the scope of the invention, which is not to be limited to the illustrative details disclosed.

I claim:

1. An airlock for use in transferring objects from a first pressure zone to a second pressure zone comprising:
  A. an hermetically sealed shell including means defining therein a chamber confining a variable pressure, and a plurality of hatches, each of the hatches including means defining in said shell an opening and a hatch cover supported to be deployed from a hatch-sealing disposition, relative to said opening, to a hatch-opening disposition, relative to the opening;
  B. cyclically operable cover deploying means for alternately deploying a cover of one hatch of said plurality of hatches to its hatch-sealing disposition and to its hatch-opening disposition;
  C. pressure responsive to an operation of the cover deploying means for alternately varying the magnitude of the pressure within the chamber;
  D. one hatch of said plurality of hatches defining a chamber ejection hatch adjacent said second pressure zone and another hatch of said plurality defining a chamber insertion hatch adjacent to said first pressure zone;
  E. the pressure of said first pressure zone being of a magnitude substantially greater than the magnitude of the pressure of said second pressure zone;
  F. said cover deploying means including means operable for moving the cover from a hatch-sealing deployment, relative to the chamber ejection hatch along a segmented path having both linear and arcuate path segments.

2. The airlock of claim 1 wherein each cover of said plurality of hatches is supported in its hatch-sealing disposition by the pressure differential established between said first and second pressure zones.

3. The airlock of claim 1 further comprising motion limiting means for limiting motion imparted to the covers during the deployment thereof to a direction such that the covers are deployed to their hatch-opening disposition in a substantially common direction extending away from said second pressure zone toward said first pressure zone.

4. The airlock of claim 1 wherein the cover deploying means includes lost-motion linkage coupled with said pressure means and with the cover of said one hatch for varying the pressure within the chamber in a predetermined sequence with the deployment of said one cover.

5. The airlock of claim 4 wherein said pressure means comprises a gas selector valve including a first port communicating with the first pressure zone, a second port communicating with the second pressure zone and a third port communicating with said chamber, and means connected with said lost-motion linkage for alternately coupling said first and second ports with said third port, whereby said chamber alternately is coupled in communication with said first and said second pressure zones for thereby alternately varying the magnitude of the pressure within the chamber to that of the first and second pressure zones for accommodating an alternate deployment of the cover of each of said hatches to its hatch-opening disposition.

6. The airlock of claim 1 further comprising means including object ejection means for ejecting through said one hatch objects introduced into said chamber from another of said hatches.

7. The airlock of claim 6 wherein said ejection means includes an extensible ram including a lazy-tong linkage seated in the cover of said another hatch, and a manually operable level coupled with said lazy-tong linkage for imparting extension thereto.

8. The airlock of claim 7 further comprising a wall of a cylindrical configuration extended between said one hatch and said another hatch in coaxial relationship therewith.

9. The airlock of claim 8 wherein said ram includes a piston head coupled with the lazy-tong linkage and supported for rectilinear reciprocation along the internal surface of said wall.

10. The airlock of claim 9 further comprising means for precluding deployment of the cover of said another hatch to its hatch-opening disposition when the cover of said one hatch is deployed in its hatch-opening disposition, and for precluding deployment of the cover of said one hatch to its hatch-opening disposition when the cover of said another hatch is in its hatch-opening disposition.

11. The airlock of claim 10 further comprising means for precluding deployment of the cover of said another hatch to its hatch-opening disposition when said lazy-tong linkage is extended.

12. An airlock for use in discharging objects of waste from a cabin enclosure maintained substantially at one atmosphere aboard an operative spacecraft to a waste receptacle attached to the spacecraft and maintained at the pressure of celestial space comprising:
  A. a bell-shaped shell hermetically sealed in an opening formed in a bulkhead of the enclosure having an inboard side and an outboard side interposed between the pressure of the enclosure, applied at the inboard side thereof, and the vacuum of the environment, applied at the outboard side thereof;
  B. means defining an insertion hatch opening within the shell adjacent the inboard side of the bulkhead and means defining an ejection hatch opening within the shell adjacent the outboard side of the bulkhead;
  C. a cylindrical wall coaxially related to said insertion hatch opening and said ejection hatch opening and extending therebetween;
  D. an insertion hatch cover mounted adjacent said insertion hatch opening and pivotally displaceable inwardly from a hatch-sealing disposition to a hatch-opening disposition relative to said insertion hatch opening;
  E. an ejection hatch cover displaceable between a hatch-sealing disposition inwardly to a hatch-opening disposition relative to said ejection hatch opening;
  F. manually operable hatch displacing means including lost-motion linkage coupled with said ejection hatch cover, including a pivotally displaceable level having a cam-and-rider coupling, for lifting said ejection hatch cover from its hatch-sealing disposition and transporting the hatch cover along a linear path and thereafter transporting the ejection hatch cover along an arcuate path away from said ejection hatch opening;
  G. a gas valve including a housing having a first conduit terminating internally of said shell, a second conduit terminating internally of said cabin, a third conduit terminating in said environment, and a rotatable selector cylinder including multiple ports for alternately coupling said first conduit with said second and third conduits;
  H. a drive linkage interconnecting said selector cylinder with said lost-motion linkage, whereby displacement of said lever from an initial position causes said selector cylinder to couple said first conduit and said third conduit, prior to the ejection hatch cover being lifted from its seat so that the vacuum of the environment is applied internally said shell, and displacement of said lever to its initial position causes said selector cylinder to couple the first conduit to said second conduit, subsequent to the ejection hatch cover being returned to its seat by said hatch displacing means;
  I. an interlock linkage interconnecting said hatch displacing means with said insertion hatch cover for precluding displacement of said insertion hatch cover to a hatch-opening disposition;
  J. an object ejection ram including a lazy-tong linkage seated in the insertion hatch cover and extensible through said ejection hatch opening for ejecting objects inserted through said insertion hatch opening; and
  K. an interlock linkage for precluding displacement of the insertion hatch cover when said ejection ram is extended.

13. An airlock for use in transferring a substance from a first pressure zone to a second pressure zone comprising:
  A. a shell having defined therein an hermetically sealed chamber disposed between said pressure zones confining therein a variable pressure;
  B. means defining within said shell an insertion hatch and a discharge hatch, said hatches being axially aligned and each including a hatch cover, the covers being alternately supported against hatch-opening displacement by a pressure differential established between the first pressure zone and the second pressure zone;
  C. a cylindrical wall coaxially related to said insertion hatch and said discharge hatch and extending therebetween with said cylindrical wall being spaced from said shell;
  D. means for displacing one of said hatch covers from a hatch-covered position to a hatch-opened position with said one cover being in said space between said cylindrical wall and said shell in its hatch-opened position;
  E. pressure control means coupled with said chamber for alternately equalizing the pressure confined within the chamber with that of the first and second pressure zones.

14. An airlock for use in transferring objects through a bulkhead hermetically sealing an enclosure from its environment and having a pressure differential established thereacross, comprising:
  A. a shell having defined therein an internal chamber and extended through an opening defined in said bulkhead;
  B. means defining in said shell a pair of mutually spaced hatch openings;
  C. a pair of hatch covers for closing said hatch openings, each of the covers being separately associated in an operative relationship with one of the hatch openings of said pair of hatch openings;

D. means supporting each of the hatch covers for cyclic displacement between hatch-opening and hatch-sealing dispositions, relative to the respective hatch opening associated therewith;

E. means including a ram supported adjacent one of said hatch openings and extensible for ejecting objects from said chamber through the other of said pair of hatch openings.

F. actuatable pressure control means including a first port communicating with said chamber, a second port communicating with said enclosure and a third port communicating with the environment cyclically operable for equalizing pressures at opposite faces of each hatch cover.

15. The airlock of claim 14 further comprising means for maintaining one of said hatch covers in a hatch-sealing disposition when the other cover of said pair is in a hatch-opening disposition.

16. The airlock of claim 15 wherein said control means further includes:

A. an hermetically sealed valve housing;

B. a first gas conduit defined in said housing and terminating at said first port;

C. a second conduit defined in said housing and terminating at said second port;

D. a third conduit defined in said housing and terminating at said third port; and E. means including a switching cylinder supported for rotation within the valve housing about its longitudinal axis of symmetry and responsive to predetermined angular displacement for alternately coupling said first conduit with said second and third conduits for alternately conducting pressures from said enclosure and said environment to said chamber, whereby pressures at the opposite faces of said hatch covers alternately are equalized for alternately accommodating displacement of the covers to their hatch-opening disposition.

17. The airlock of claim 16 further comprising:

A. cover actuating means connected with one of said hatch covers and responsive to a manipulation thereof for displacing the hatch cover; and B. means responsive to a manipulation of said cover actuating means for rotating said switching cylinder in a predetermined direction and in a predetermined sequence with the displacement of a selected hatch cover.

18. The airlock of claim 17 wherein the hatch openings of said pair of hatch openings are disposed at opposite sides of said bulkhead, whereby one of the hatch openings communicates with said enclosure and defines a chamber insertion hatch, and the other opening of said pair communicates with said environment and defines a chamber ejection hatch for accommodating a passage of objects through the bulkhead.

19. The airlock of claim 14 further comprising:

A. means for precluding a concurrent displacement of the hatch covers to their hatch-opening dispositions; and B. means for precluding displacement of the hatch cover of said other hatch to its hatch-opening disposition when said ram is extended.

* * * * *